United States Patent
Bilgic et al.

(10) Patent No.: US 7,313,171 B2
(45) Date of Patent: Dec. 25, 2007

(54) APPARATUS FOR DATA TRANSMISSION PATH DETECTION

(75) Inventors: Attila Bilgic, Kirchheim (DE); Mauro Bottero, Mougins le Haut (FR); Jean-Xavier Canonici, Le Cannet (FR); Manfred Zimmermann, München (DE)

(73) Assignee: Infineon Technologies AG, Munich (DE)

( * ) Notice: Subject to any disclaimer, the term of this patent is extended or adjusted under 35 U.S.C. 154(b) by 649 days.

(21) Appl. No.: 10/774,046

(22) Filed: Feb. 5, 2004

(65) Prior Publication Data
US 2004/0179584 A1 Sep. 16, 2004

(30) Foreign Application Priority Data
Feb. 5, 2003 (EP) .................. 03002483

(51) Int. Cl.
*H04B 1/00* (2006.01)
(52) U.S. Cl. ...................................... 375/148
(58) Field of Classification Search ........... 375/148, 375/150, 227, 147, 317, 144; 370/335, 342, 370/350; 455/63.1, 67.11, 456.1
See application file for complete search history.

(56) References Cited

U.S. PATENT DOCUMENTS 7,142,586 B2 * 11/2006 Reial .................. 375/148

2003/0235241 A1 * 12/2003 Tamura .................. 375/150
2004/0071193 A1 * 4/2004 Atarashi et al. ............ 375/144
2004/0132443 A1 * 7/2004 Klein et al. .................. 455/424

FOREIGN PATENT DOCUMENTS

| EP | 0 989 685 A2 | 3/2000 |
| EP | 1 148 657 A2 | 10/2001 |
| EP | 1 170 876 A2 | 1/2002 |

OTHER PUBLICATIONS

Bejjani, Elie, Jean-Francois Bouquier, Benoit de Cacqueray, "Adaptive Channel Delays Selection for WCDMA Mobile System," IEEE Alcatel Corporate Research Center, © 1999, pp. 203-207, (5 pages).
Elders-Boll, Harald, "Simplified Interference-Based Threshold Rule for Delay Selection in DS-CDMA Systems," IEEE Synopsys, Professional Services Group, © 2000, pp. 77-81, (5 pages).
Miyatani, Tetsuhiko, Kenzo Urabe, and Yoshihiko Akaiwa, "A Reduced-Complexity Path Timing Detection Method for DS-CDMA," IEEE, © 1998, pp. 357-361 (5 pages).

* cited by examiner

*Primary Examiner*—Khanh C. Tran
(74) *Attorney, Agent, or Firm*—Maginot, Moore & Beck

(57) ABSTRACT

A method and apparatus for detecting paths of a received signal by analyzing a delay power profile of the received signal comprises a detection of peaks in the delay power profile by a peak detector having a threshold that is set based upon the noise environment. Peaks detected by the peak detector are passed to a data path detector having second threshold set at a power level higher than the threshold in the peak detector. In one embodiment, a third threshold is set within a filter to suppress secondary maxima created by the generation of the delay power profile. The detected paths may set in a rake type receiver.

14 Claims, 6 Drawing Sheets

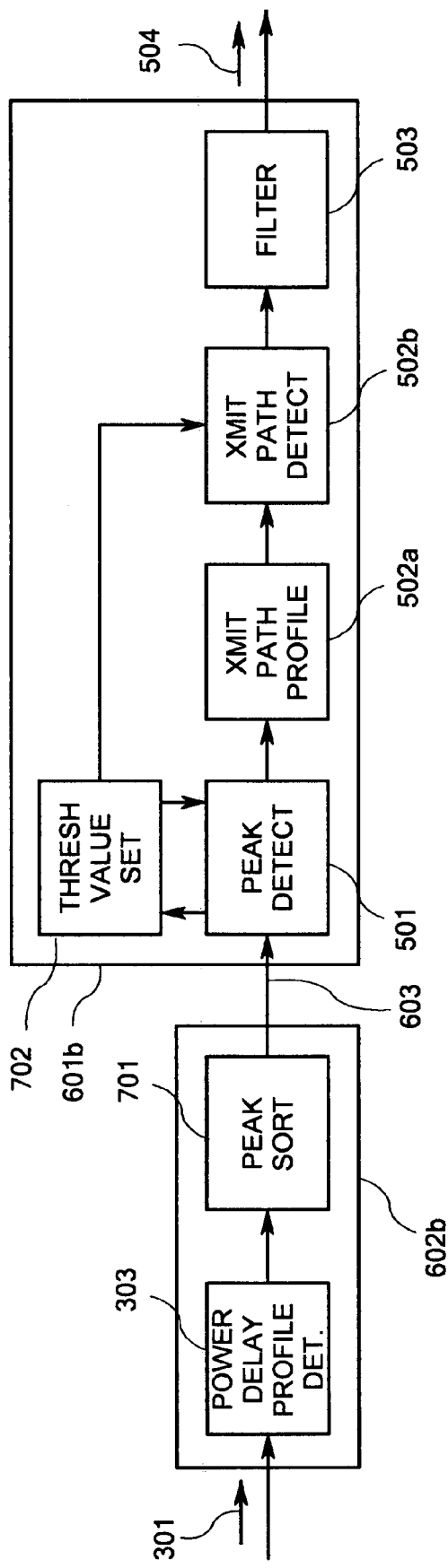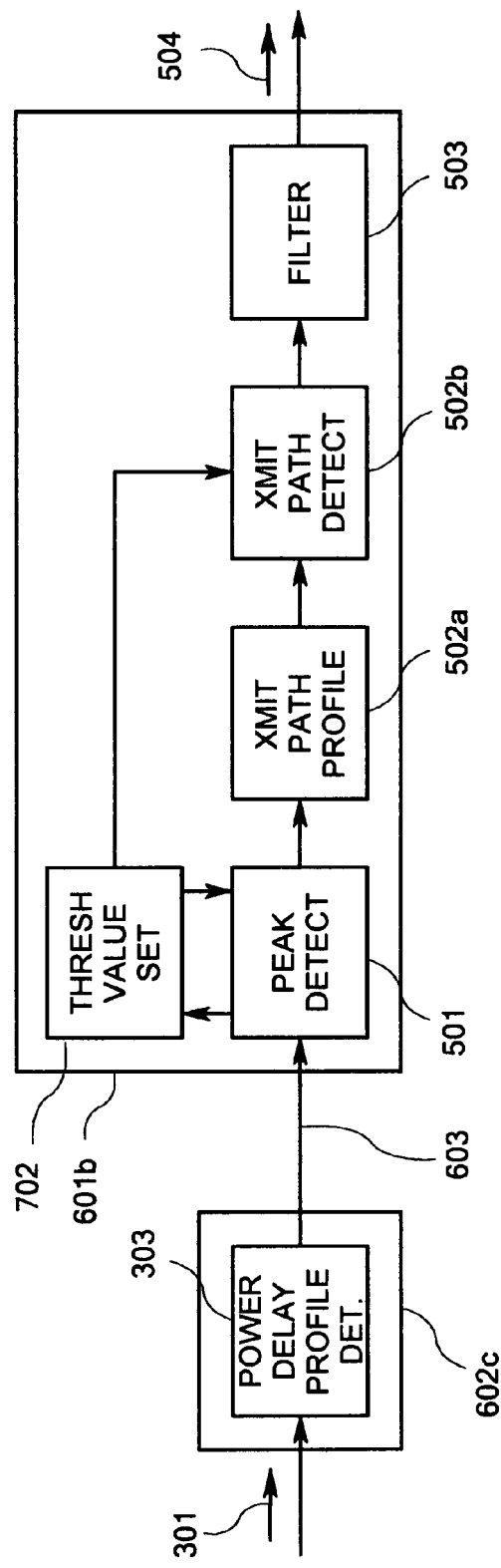

APPARATUS FOR DATA TRANSMISSION PATH DETECTION

This application claims the benefit of European Patent Authority; 03002483.0, filed Feb. 5, 2003.

FIELD OF THE INVENTION

The present invention relates to the field of wireless transmission, and more particularly to the detection of transmitted signals.

BACKGROUND

CDMA data transmission systems, for example for use in a 3GPP-WCDMA-FDD device, usually have a "rake" receiver comprising various "fingers", with each finger being assigned to a delayed path (data transmission path) [lacuna] received signal.

The number of active fingers and the delay in each "finger" in a rake receiver are assigned on the basis of a data transmission path searching unit. The operating parameters for the data transmission path searching unit are assigned by a "finger" management unit.

In wireless data stream transmission systems, signals pass via different data transmission paths to which different "fading" can be applied.

Since every data transmission path has a different length and the data stream signals propagate on the different paths at approximately the same data transmission speed, the data stream signal arrival times at the data stream receiver differ, in some cases substantially, for the different data transmission paths.

The data transmission path searching unit is now used to determine an arrival time for the data stream signals from the different data transmission paths. In line with the 3GPP standard (UMTS), the data stream is made up of frames and slots (data frames and data slots). A data frame has, by way of example, a duration of 10 milliseconds (ms) and contains 15 data slots. Each data slot has 2560 chips, which means that the chip frequency in this example is 3.84 MHz.

Since the bandwidth of a CDMA system is usually high, a chip period is very small, which means that delays on different data transmission paths are usually greater than one chip period.

These delayed arrival times for the various propagation paths result in data symbols transmitted at various times being superimposed at the receiver, an effect which is called intersymbol interference (ISI) and, without suitable countermeasures, has disadvantageous consequences for data reception. To compensate for ISI and to make advantageous use of the diversity of the various propagation paths, CDMA systems usually involve the use of a technique which is used to receive the data stream signals from all the relevant data transmission paths separately, and they are then combined.

On the basis of the prior art, this is done in a rake receiver, which is a data stream receiver which receives as many multipath data stream signals as possible. The rake receiver combines the signals from all these paths to produce a data stream signal which is as "interference free" as possible and which is stronger than the individual components. Individual paths are found by cross-correlating a reference pattern with the received signal.

The estimation of "power delay profiles" (PDPs) is fundamental to the operability of a rake receiver. The power delay profiles for different data transmission paths are estimated, by way of example, by a mobile UMTS receiver in order to determine the amplitude or a power and the delayed timing of the data transmission paths for data streams with regard to a receiver timing reference.

The power delay profile is determined by means of a correlation using a (primary or secondary) "pilot channel" (CPICH—Common Pilot Channel) which transmits a predetermined symbol sequence. In conventional manner, a complex correlation is provided between the incoming signal (r(i)), which is sampled at double the chip rate, and a known, complex conjugate pilot sequence signal p*(i), likewise sampled at double the chip frequency, in line with the general relationship, where $N_{corr}$ is the correlation length.

$$\underline{corr}_{compl}(n) = \frac{1}{N_{corr}} \sum_{i=0}^{N_{corr}-1} r(2i+n) \cdot \underline{p} * (2i) \quad n = 0, 1, 2, \ldots, L-1$$

In the case of the transmission diversity which is possible in the UMTS standard, it is necessary to perform this correlation for the data transmission paths of an "antenna 1" and of an "antenna 2". In this context, the expressions "antenna 1" and "antenna 2" denote two different transmission devices in a data stream transmitter, for example antennas, so that at least two different data transmission paths are produced. In this context, the correlation length $N_{corr}$ is an even-numbered multiple of a pilot sequence symbol length, i.e. an even-numbered multiple of a CPICH symbol length of 256 chips. Although increasing the correlation length $N_{corr}$ increases the signal-to-noise ratio for a power delay profile estimation in a desirable manner, on the other hand this power delay profile estimation then becomes more sensitive to any sampling clock error. For this reason, a power delay profile estimation needs to be averaged over time.

The operability of the rake receiver is based quite fundamentally on correct positioning of a particular number of rake fingers on multiple data transmission paths in order to be able to combine the power thereof and to obtain a diversity boost.

Conventional methods use a "PDP (Power Delay Profile) determination device" in order to determine those data transmission paths which have the highest power. The output of each PDP determination device is compared with a threshold value, and all peak values in the received signal above this threshold are processed further by a finger positioning block.

Disadvantageously, the setting of a threshold value is extremely critical with regard to the detection of incorrect data transmission paths. Particularly in environments with a low signal-to-noise ratio or a high level of noise, which can be brought about, in particular, by a moving, mobile data stream receiver on account of fading effects, the amplitude distributions of noise and amplitude distributions of data transmission paths can overlap such that exact setting of a threshold value is no longer possible.

In conventional manner, the PDP determination device is in the form of a correlation filter, for example, which has the further disadvantage that secondary maxima are produced which simulate invalid data transmission paths, i.e. shadow data transmission paths.

If the threshold value is set to be too low, then a power delay profile determination is severely disturbed by noise, and not all peak values which are linked to a correlation of received signal and pilot sequence signal correspond to actual, i.e. valid, data transmission paths.

Disadvantageously, the peak values of the useful signal and of the noise signal are subject to statistical processes, which means that a relation between data transmission paths and noise peak values in the case of power delay profile determination is a statistical process which is dependent on an existing noise scenario.

In particular, conventional methods have disadvantages to the effect that data transmission paths are not correctly identified if, as is unavoidable in the case of mobile systems, new data transmission paths appear and existing data transmission paths disappear, which means that uniform monitoring of the data transmission paths is necessary.

It is therefore an object of the present invention to provide an apparatus for receiving a data stream which can be transmitted via at least one data transmission path in which a level of accuracy for data transmission path detection is improved as compared with conventional methods, with noise peak values differing from data transmission path peak values, and shadow data transmission paths being able to be avoided.

SUMMARY

In accordance with the present invention, transmission path detection is accomplished using threshold settings within a peak value detection device, a data transmission path profile determination device and, in one embodiment, a shadow transmission path filter. The thresholds in the peak detection device and data transmission path profile determination device are adapted to the noise environment. The threshold in the filter is established to suppress secondary maxima resulting from a correlation filter used to generate a delay power profile.

The advantage of the invention is thus that different signal-to-noise scenarios can exist with which the inventive apparatus can align itself.

Expediently, this increases the detection probability for valid data transmission paths, whereas a probability of detection of invalid data transmission paths is reduced as compared with methods based on the prior art.

Another advantage is that the setting of a threshold value is no longer critical as compared with the prior art, since the threshold value is automatically aligned with a noise environment.

It is also advantageous that different threshold values are provided which permit peak value detection, data transmission path profile determination and shadow data transmission path filtering.

In particular, it is expedient that the threshold values can be adapted to different environment scenarios if information is available about the environment scenarios.

Advantageously, the inventive apparatus can be implemented in a CDMA modem.

In one embodiment of the invention, an apparatus for receiving a data stream which can be transmitted via at least one data transmission path essentially has:
 a) a data stream receiver for receiving the data stream;
 b) a power delay profile determination unit for determining at least one power delay profile;
 c) a peak value detection device for detecting at least one peak value in the power delay profile;
 d) a data transmission path profile determination device for determining a data transmission path profile for the at least one data transmission path;
 e) a filtering device for suppressing shadow path signals and for outputting a finger positioning signal; and
 f) a setting device for setting data transmission paths, which are associated with a data transmission, on the basis of the finger positioning signal.

In line with one preferred development of the present invention, the peak value detection device has a comparison unit for comparing the power delay profile with a first threshold value.

In line with another preferred development of the present invention, a power delay profile determination unit for determining at least one power delay profile for the at least one data transmission path is provided.

In line with yet another preferred development of the present invention, a summation unit for summing the data streams transmitted by individual data transmission paths is provided.

In line with yet another preferred development of the present invention, the peak value detection device has a threshold value setting unit which can be used to set the first threshold value adaptively.

In line with yet another preferred development of the present invention, the data transmission path profile determination device has a data transmission path profile unit for summing weighted peak values and a data transmission path detection unit for detecting a valid data transmission path.

In line with yet another preferred development of the present invention, the power delay profile determination unit is provided together with a peak value sorting unit in a common matched hardware block.

In line with yet another preferred development of the present invention, a received signal strength determination unit for determining the received signal strength of the received signal is provided in a matched hardware block.

In accordance with one embodiment of the present invention, a method for receiving a data stream transmitted via at least one data transmission path comprises the following steps:
 a) receiving the data stream;
 b) determining at least one power delay profile;
 c) detecting at least one peak value in the determined power delay profile;
 d) determining a data transmission path profile;
 e) suppressing shadow transmission path signals; and
 f) setting data transmission paths in a receiver.

The "shadow transmission path" to which reference is made in this context is a transmission path which is invalid, i.e. which does not contribute to data transmission of the data stream which is to be transmitted. A shadow transmission path can be simulated, by way of example, by secondary maxima from a correlation filter contained in a power delay profile determination unit.

In line with yet another preferred development of the present invention, a first threshold value is set on a variable basis in the peak value detection device.

Advantageously, a first threshold value may be set on the basis of a noise environment.

Another advantage is that a first threshold value may be set on the basis of a mean value, a variance and/or a standard deviation for noise peak values.

In line with yet another preferred development of the present invention, the first threshold value is matched to a noise environment such that a preselection of possible data transmission path positions is advantageously provided.

In line with yet another preferred development of the present invention, the power delay profile estimation and the peak value detection are performed periodically by the peak value detection device.

The present invention advantageously permits the power delay profile estimation and the peak value detection to be performed periodically by the peak value detection device at an interval of time which corresponds to a data frame or to a multiple of data frames.

In line with yet another preferred development of the present invention, a prescribable number of preceding periods in the data transmission path profile determination device is stored, with the detected peak values preferably being summed in the manner of an ongoing histogram. It is also expedient that the data transmission path profile determination device stores the prescribable number of preceding periods and weights the detected peak values before summation with a received signal strength.

In line with yet another preferred development of the present invention, the temporal summation points when the detected peak values are summed by the data transmission path profile determination device correspond to delay positions k=0, 1, . . . , L−1 of a correlation function.

In line with yet another preferred development of the present invention, those data transmission path positions which appear fewer than a predetermined number of times are set to 0.

In line with yet another preferred development of the present invention, a second threshold value is prescribed in the data transmission path profile determination device, and the peak values summed in the manner of an ongoing histogram are compared with it.

In line with yet another preferred development of the present invention, the second threshold value is set on the basis of an existing noise or an existing noise environment or an existing noise scenario.

In line with yet another preferred development of the present invention, the second threshold value is provided on the basis of the first threshold value, which is multiplied by a constant factor.

In line with yet another preferred development of the present invention, secondary maxima from a correlation filter are compared with a third threshold value in the filtering device for suppressing shadow transmission path signals.

In line with yet another preferred development of the present invention, the first, second and/or third threshold values are updated periodically.

BRIEF DESCRIPTION OF THE DRAWINGS

Exemplary embodiments of the invention are illustrated in the drawings and are explained in more detail in the description below. In the drawings:

FIG. 7 shows another preferred exemplary embodiment based on the present invention; and FIG. 8 shows yet another preferred exemplary embodiment based on the present invention.

In the figures, identical reference symbols denote components or steps which are the same or have the same function.

DETAILED DESCRIPTION

Figure 1:
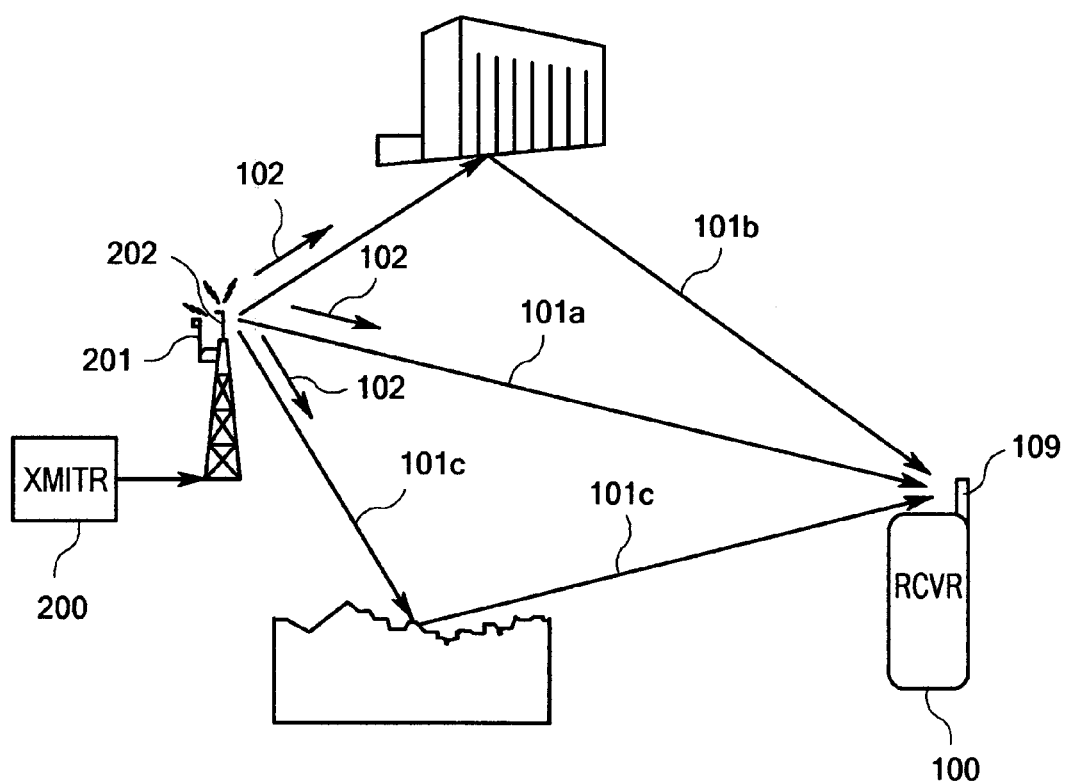
FIG. 1 shows a schematic block diagram of a data transmission system having multiple data transmission paths.

FIG. 1 shows a schematic block diagram of a data transmission system in which different data transmission paths 101, namely direct data transmission paths 101a and indirect data transmission paths 101b, 101c, contribute to transmission of data stream 102.

There are a direct data transmission path 101a and data transmission paths which proceed through reflections on buildings, elevations and other facilities etc., such as the data transmission paths 101b and 101c. In this context, a data stream transmitter 200 typically has one or two transmission devices (antennas) 201 and 202, while a data stream receiver 100 has a reception device 109.

As can be seen from the block diagram in FIG. 1, the propagation times on the data transmission paths 101a-101c transmitting the data stream 102 are different. In a "worst case", the delay time is typically 30 μs, which corresponds to a distance difference of 9 km. This "worst case" delay time has been specified by test cases in the 3GPP standard. To calculate a power delay profile, a number L of values which, for this "worst case", has been set to L=240 is required.

Figure 2:
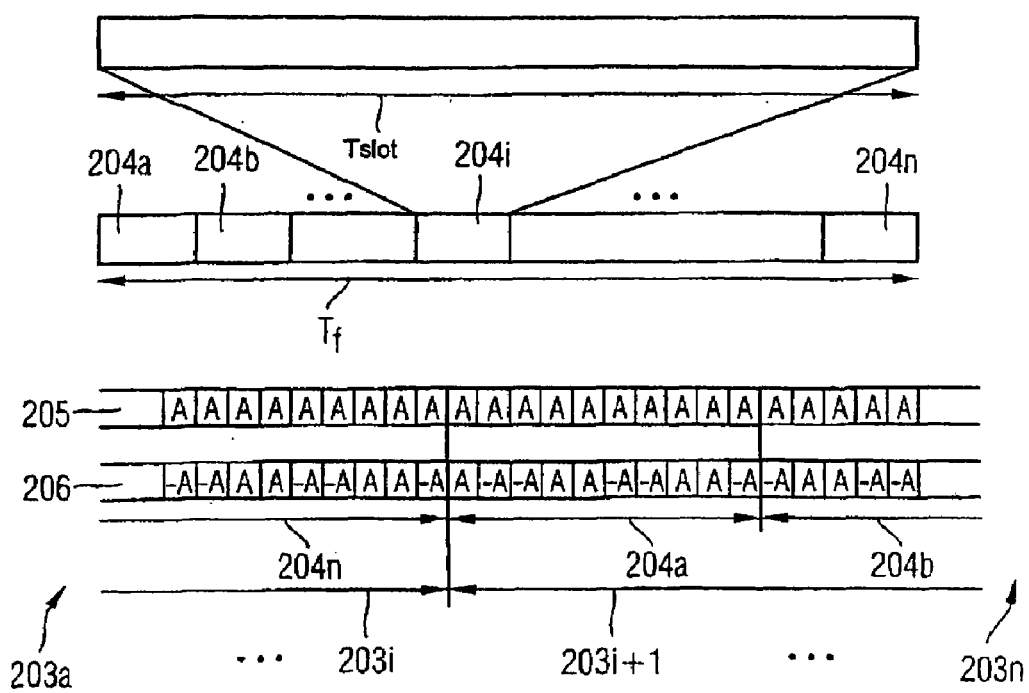
FIG. 2 shows a schematic structure for a pilot channel which can be used to transmit a pilot sequence signal having a prescribed symbol sequence.

FIG. 2 schematically shows the structure of a pilot channel with a prescribed pilot sequence. As shown, a data stream is made up of individual data frames 203a . . . 203i . . . 203N. In the exemplary embodiment of the invention, each data frame has a duration of $T_f$=10 ms (milliseconds). Each data frame is divided into individual slots 204a . . . 204i . . . 204n.

In the exemplary embodiment of the invention, a data frame is divided into n=15 slots. Each slot transmits 10 symbols, which are denoted by A and −A in FIG. 2. The first symbols, indicated by the reference symbol 205 for a first antenna 1 or for a first transmission device 201, and the second symbols, indicated by the reference symbol 206 for a second antenna 2 or for a second transmission device 202, for a specific slot form a pilot sequence signal with a prescribable pilot sequence.

A symbol is made up of 256 chips in the exemplary embodiment, where a chip represents the smallest digital unit. This means that a time slot $T_{slot}$ comprises 2560 chips, and when two bits are provided per symbol—for real and imaginary parts, i.e. (1+j)−20 bits are provided for each individual slot 204a-204n.

With the indicated duration of a data frame 203 and the prescribed number of 15 slots which each contain ten symbols or 2560 chips, a chip rate of 3.84 Mchip/s is obtained. To form correlation functions, the data stream is now sampled at double the chip rate, i.e. at $7.68 \times 10^6$ sampling steps per second.

This makes it possible to determine a correlation function with a resolution of half a chip. Advantageously, a correlation length $N_{corr}$ is set to a multiple of the symbol length (×1, ×2, ×4 . . . ).

The variable L indicated in the equation above thus denotes a maximum shift when forming the correlation functions, i.e. n proceeds from 0, 1, 2 . . . L−1. If L is set equal to 240, the result is a delay time of 31.25 μs, which is also sufficient for the "worst case".

In line with the equation above, the result both for an antenna 1 and for an antenna 2, i.e. transmission devices 201 and 202, is different correlation functions as a function of n, with a total power delay profile being determined by forming the sum of the squares of the magnitudes of the individual correlation functions.

This results in a power delay profile PDP as a function of n as follows $$\underline{X}_{Ant1}(n) = \sum_{i=0}^{N_{corr}-1} \underline{r}(n+2i) \cdot \underline{p}^*_{Ant1}(2i) \quad (1)$$

$$\underline{X}_{Ant2}(n) = \sum_{i=0}^{N_{corr}-1} \underline{r}(n+2i) \cdot \underline{p}^-_{Ant2}(2i) \quad (2)$$

$$PDP(n) = |\underline{X}_{Ant1}(n)|^2 + |\underline{X}_{Ant2}(n)|^2 \quad (3)$$

In equations (1) to (3), the received, complex signal (received signal) is respectively denoted by $\underline{r}(n)$, while $\underline{p}(i)$ denotes the complex pilot signal, where r(n) and p(i) are respectively sampled at double the chip rate.

In this case, the shift is indicated by n=0, 1, 2, ... L−1.

The power delay profile PDP is thus obtained through the sum of the squares of the magnitudes in line with equation (3) and is denoted by PDP(n). The power delay profile determination now needs to be averaged over a plurality of blocks with a correlation length $N_{corr}$. $N_{avg}$ denotes a number of blocks over which averaging takes place, the magnitude $N_{avg}$ being able to vary on the basis of the network conditions.

In line with the example of the invention, it is now possible to alter the correlation length $N_{corr}$ and the number of averaging operations $N_{avg}$ without the need to alter or align hardware designs.

Figure 3:
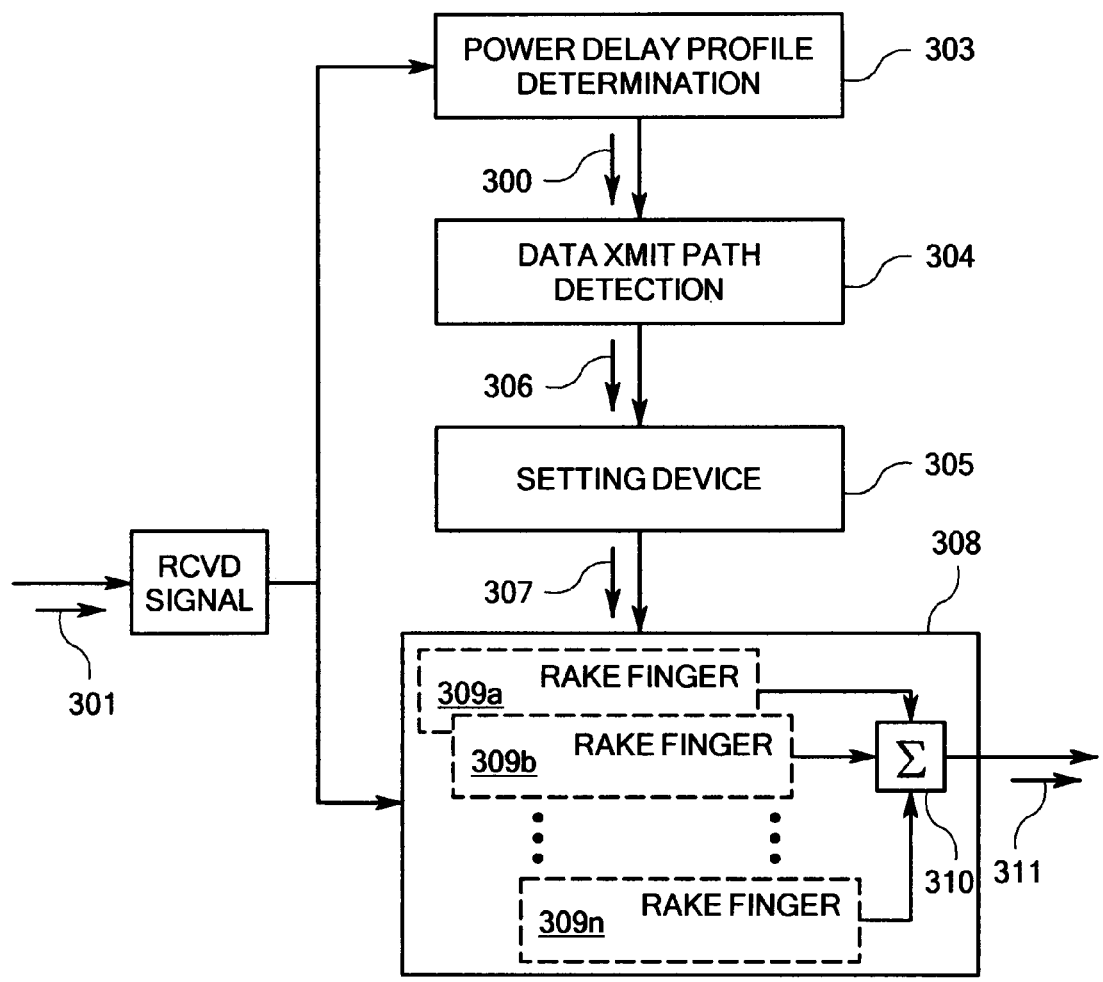
FIG. 3 shows a block diagram of a rake receiver with devices for data transmission path detection and finger positioning.

FIG. 3 shows a rake receiver which is used as a data stream receiver for receiving a data stream 102 which can be transmitted via at least one data transmission path. The rake receiver comprises a power delay profile determination unit 303 which is used to determine a power delay profile 300 (PDP).

The rake receiver also has a data transmission path detection unit 304, a setting device 305 and a processing device 308. The fundamental components of the processing device 308 comprise a summation unit 310 which sums different rake fingers 309a-309n in order to stipulate data transmission paths 101, 101a-101c which are suitable for transmitting the data stream 102.

The rake receiver receives the data transmitted using the data stream 102 in the form of a received signal 301.

The received signal is then correlated with a pilot sequence signal in the power delay profile determination unit, as already described, the correlation function for determining a power delay profile as a function of (k), i.e. the variable pdp$_{est}$(k), having the following form:

$$pdp_{est}(k) = \frac{1}{N_{avg}} \cdot \frac{1}{N_{corr}^2} \cdot \quad (4)$$

$$\sum_{l=0}^{N_{avg}-1} \left| \sum_{n=n_{start}+l \cdot N_{corr}}^{n_{start}+(l+1)N_{corr}-1} r(2n+k) \cdot p^*(2n) \right|^2$$

where $k = 0, 1, \ldots, L-1$, the received signal 301 being denoted by r(n) and the pilot sequence signal being denoted by p(k) in this context, with the two signals representing complex variables and being prescribed on the basis of the following equations (5) and (6):

$$r(n) = r_s(n) + jr_Q(n) \quad (5)$$

$$p(n) = p_s(n) + jp_Q(n) \quad (6)$$

$N_{corr}$ thus denotes a (partial) correlation length and $N_{avg}$ denotes a number of averaging operations over (partial) correlations.

Both signals, the received signal and the pilot sequence signal, are sampled at double the chip rate. The power delay profile pdp (k) determined in line with the above equation (4) is finally output from the power delay profile determination unit 303 and is supplied to the data transmission path detection unit 304.

In line with the invention, a first threshold value 103a (explained below with reference to FIG. 4) is now added at a low position in the power delay profile determination unit 303, which means that although data transmission paths have been preselected, a high rate of invalid data transmission paths is obtained.

In the data transmission path detection unit, the peak values 401a-401n (FIG. 4) of a received signal power 107 are summed, with values which belong to the same delay time (k) being added. In this context, it is possible to stipulate a number $N_{occ}$ which indicates how often a peak value 401a-401n needs to have been above the settable first threshold value 103a in order for the position of this peak value to be identified as a data transmission path.

A corresponding data transmission path position signal 306 is then output from the data transmission path detection unit 304 and is supplied to the setting device 305. The setting device 305 then selects those positions from the power delay profile which need to be received with the fingers of the rake receiver.

A rake finger thus corresponds to a propagation path. The rake fingers are summed in the summation unit 310 of the processing device 308 in accordance with a finger position signal 307 which is output by the setting device 305 and are output as an output signal 311.

Figure 4:
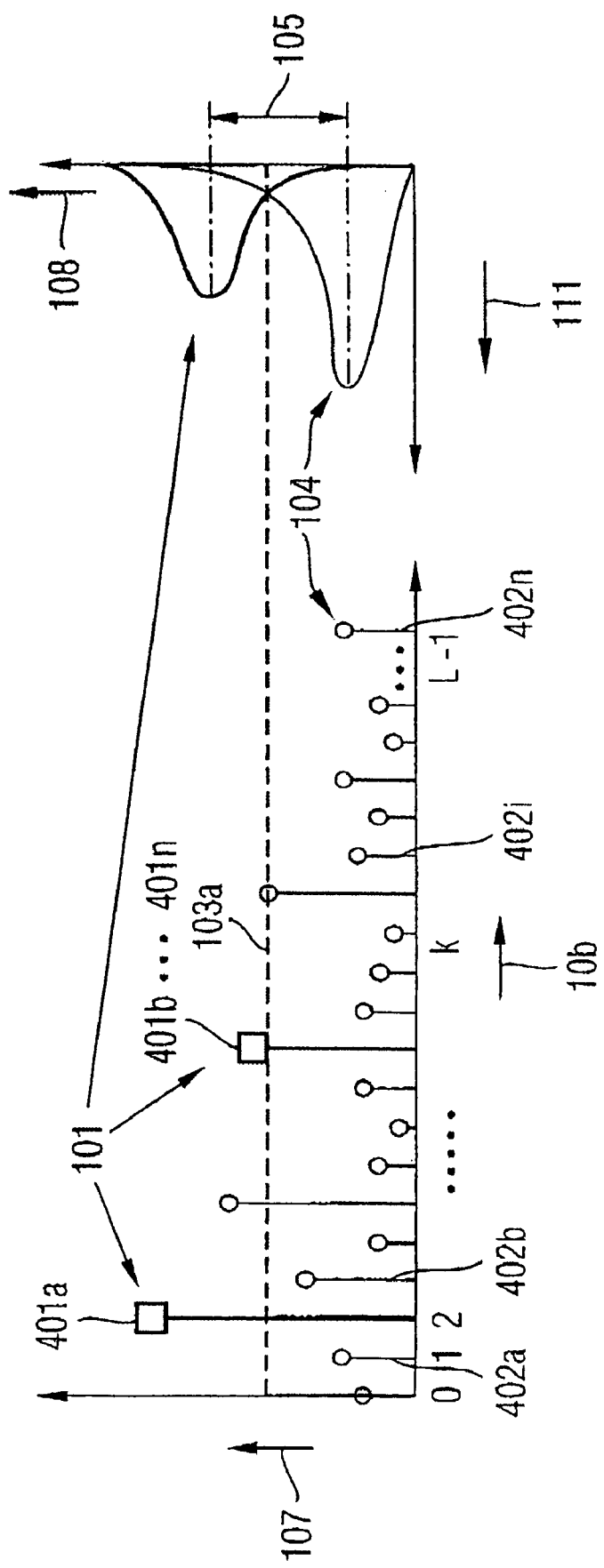
FIG. 4 shows a graph showing peak values for the useful signal (data transmission signal) and for noise signals in relation to a threshold value which is set in order to determine power delay profiles.

FIG. 4 shows a graph with different peak values 401a-401n, which correspond to data transmission paths 101a-101n, and also noise peak values 402a-402n. In addition, the right-hand graph in FIG. 4 shows a function of a probability distribution 111 over a power 108, with two maxima having been set by way of example. The maximum at low power 108 corresponds to a noise signal 104, while the maximum at high signal power corresponds to the data transmission paths 101. The distance between the two maxima can be referred to as a signal-to-noise ratio 105. In conventional methods based exclusively on the setting of the first threshold value 103a, one drawback is that if the threshold value 103a has been set to be too low, a false alarm rate rises inadmissibly, whereas if the threshold value 103a has been set to be too high, a detection rate for valid data transmission paths decreases.

In line with the invention, as will be explained below with reference to FIG. 5, the first threshold value 103a is set to be low, which means that numerous noise peak values 402a-402n are also detected.

Figure 5:
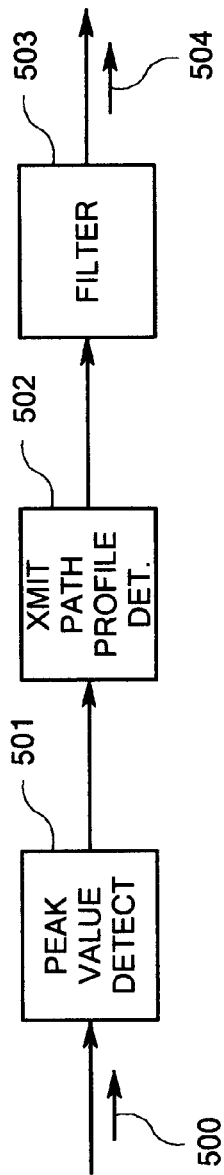
FIG. 5 shows a block diagram of an exemplary embodiment of the inventive method.

FIG. 5 shows a block diagram relating to the performance of a method in line with a preferred exemplary embodiment of the invention. Besides a peak value detection device 501, data analysis data processing is performed in a data transmission path profile determination device 502 and in a filtering device 503.

The peak value detection device 501 is supplied with a power delay profile signal which is determined by the power delay profile 300. This signal is compared with the set, first threshold value 103a in a comparison unit in the peak value detection device 501. This first threshold value 103a is chosen to be low in comparison with methods based on the prior art, as a result of which a detection probability for invalid paths rises, but also a detection probability for valid paths increases overall. The value which is output -from the peak value detection device 501 and is supplied to the data transmission path profile determination device 502 thus also represents just one preselection of possible data transmission path positions. In this first step, power delay profile determination (or power delay profile estimation) and peak value detection are performed periodically, typically with an interval of time for the frame or multiple frames, i.e. at an interval of 10 ms, respectively 20 ms, . . . etc.

The signal which is output by the peak value detection device 501 is processed further in the data transmission path profile determination device 502. In the data transmission path profile determination device, the detected peak values 401a-401n, like the detected noise peak values 402a-402n, are added for the last M periods for respectively identical delays (k) in line with the method of an ongoing histogram. The containers for this ongoing "histogram" correspond to all possible delay positions k(0 . . . L−1). All positions which do not appear at least $N_{occ}$ times within this observation window of length M are set to 0 in order to suppress high noise peak values or unstable data transmission paths.

Since the number of detected peak values is typically low as compared with the power delay profile length ($N_{peak}$<<L), this data transmission path profile histogram needs to be calculated only for the delay positions at which a path has appeared within the last M-PDP determination periods.

The result of this histogram is subsequently compared with a second threshold value 103b. All positions which exceed this second threshold value 103b are processed further and are output from the data transmission path profile determination device 502.

The second threshold value 103b is derived from an estimation of the noise environment. Since noise peak values are statistically independent events, they usually appear at different positions in successive PDP determination steps. The second threshold value can be chosen, by way of example, on the basis of $$S_{103b} = N_{occ} \cdot S_{103a} \quad (7)$$

where S denotes the corresponding threshold values.

Equations (8) and (9) below thus give probabilities of noise peak values 401 being identified which are increased as compared with the conventional method, which uses just a peak value detection device 501. At the same time, the detection probability for valid data transmission paths (equation 9) has remained the same.

$$P_{502} = (P_{501})^{N_{occ}} \text{ for } 402 \quad (8)$$

$$P_{502} = P_{501} \text{ for } 401 \quad (9)$$

On account of this effect, most noise peak values are suppressed at the stage of the data transmission path profile determination device 502, while a detection probability for the peak value 401, 401a-401n for the useful data stream signal is maintained.

The output signal from the data transmission path profile determination device is finally also supplied to the filtering device 503, which provides a further improvement in the signal-to-noise ratio.

In the filtering device 503, a third threshold value 103c is provided which is used to suppress secondary maxima from a correlation filter device which is used in the power delay profile determination unit 303. The filtering device 503 is necessary particularly in scenarios in which a high signal-to-noise ratio is maintained, in which case the amplitudes of the correlation secondary lobes are in the same range or higher than the noise peak values.

These secondary maxima are brought about by less than optimal orthogonality in sampling code sequences of length $N_{corr}$, and typically have the same position in consecutive PDP determination steps, these being spaced apart from one another by exactly one frame or a multiple of frames. The secondary maxima can result in the detection of (invalid) "shadow data transmission paths" 101s, which cannot be suppressed by the first two stages 501 and 502.

Since the side lobes of a particular sampling code have a defined relationship with the primary peak value 401a-401n, the third threshold value 103a can be determined from the amplitude of the position of the strongest data transmission path and can be set with a variable $\Delta_{103c}$ in line with the formula below $$S_{103c} = \text{Max}\{401a, \ldots, 401n\}/\Delta_{103c} \quad (10)$$

The parameter $\Delta_{103c}$ depends on the settings of the PDP determination device $N_{corr}$ and $N_{avg}$ and can be derived in advance and stored in a table. As the result of this third stage, the filtering device 503 outputs a finger positioning signal 504 which outputs the detected data transmission paths (described by a position and accumulated in the power over M periods). The detected data transmission paths are supplied to the processing device 308 described in FIG. 3 in the form of a finger position signal 307, so that corresponding adjustments for the rake fingers and summation thereof can be performed.

Figure 6:
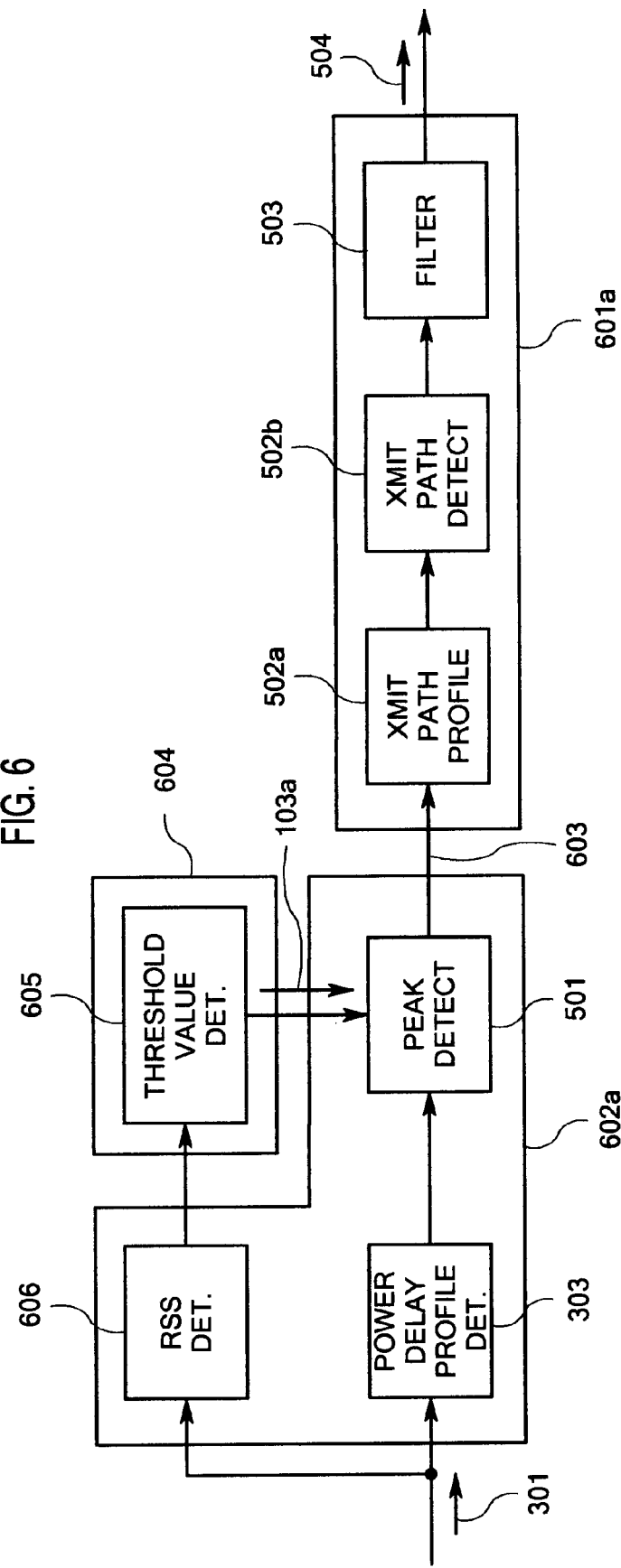
FIG. 6 shows a preferred exemplary embodiment based on the present invention.

To perform automatic data transmission path detection, the threshold values 103a, 103b and 103c are automatically set and aligned with the corresponding noise environment. The setting for the first and second threshold values 103a and 103b can be derived on the basis of an estimation of a mean value $\mu_{pdp}$ and of a variance $\sigma^2_{pdp}$ or of a standard deviation $\sigma_{pdp}$ in the noise samples $pdp_{cst}$. In this context, the mean value $\mu_{pdp}$, the variance $\sigma^2_{pdp}$ and the standard deviation $\sigma_{pdp}$ are detected from a received signal strength which, as will be explained with reference to FIG. 6, is output from a received signal strength determination unit 606.

In the formulae below, this variable for the received signal strength is denoted by RSSI (Received Signal Strength Indicator).

$$S_{103a} = a_1 \cdot \mu_{pdp} + b_1 \sigma_{pdp} \quad (11)$$

or $$S_{103a} = a_1 \mu_{pdp} + b_2 \sigma^2_{pdp} \quad (12)$$

The variables $\mu_{pdp}$, $\sigma_{pdp}$ and $\sigma^2_{pdp}$ are determined from the signal RSSI in line with the equations below $$RSSI = \frac{1}{N_{RSSI}} \sum_{n=0}^{N_{RSSI}} (r^2 s(n) + r^2 Q(n)) \quad (13)$$

-continued $$\sigma_{pdp} = \frac{RSSI}{N_{corr}\sqrt{N_{avg}}} \quad (14)$$

$$\sigma_{pdp}^2 = \frac{RSSI^2}{N_{corr}^2 \cdot N_{avg}} \quad (15)$$

$$\mu_{pdp} = \frac{RSSI}{N_{corr}} \quad (16)$$

Since the variable RSSI can change over time, the threshold values need to be updated periodically. If a distribution of noise samples corresponds to a Gaussian distribution function, the false detection rate $P_{502}$ can be controlled exactly by the first threshold value 103a in line with equation (11). The second threshold value 103b can be chosen on the basis of the first threshold value 103a, in line with $$S_{103b} = c \cdot S_{103a} \quad (17)$$

Further preferred exemplary embodiments of the present invention will be described below.

In the subsequent figures, a reference symbol 601 denotes a processor device which has a multipurpose processor in software. This multipurpose processor can be implemented, by way of example, in a digital signal processor or a microcontroller.

A reference symbol 602 distinguishes a matched hardware block which needs to be designed specifically for the corresponding exemplary embodiment. The matched hardware block 602 and the processor device 601 are connected by means of a processor bus 603.

In line with the exemplary embodiment shown in FIG. 6, the matched hardware block 602a has a power delay profile determination unit 303, a peak value detection device 501 and a received signal strength determination unit 606. In addition, the matched hardware block 602a can comprise a threshold value determination unit 605, which can also be provided in the form of a software module on the processor, however. The received signal 301 is supplied both to the power delay profile determination unit 303 and to the received signal strength determination unit 606.

From the received signal strength determination unit 606, an RSSI signal is derived in order to supply it to the peak value determination unit 605. To detect peak values in the peak value detection device 501, the first threshold value 103a is first determined in the threshold value determination unit 605 and is supplied to the peak value detection device.

It will be pointed out that an optimized first threshold value 103a can change for each power delay profile determination step, which means that it may be necessary to update this parameter for each individual determination operation in order to obtain an optimum operating response.

For these reasons, it is advantageous to set the first threshold value 103a on the basis of the RSSI signal, which has been derived on the basis of equation (14) above. The peak values 401a-401n detected using the set first threshold value 103a are stored in an output buffer store (not shown) and are then supplied to the processor device 601 via the processor bus 603.

In the case of hardware calculation of the first threshold value 103a, it is also necessary to supply the first threshold value to the processor device 601, since calculation of the second threshold value 103b is based on the first threshold value 103a, cf. equation (17) above.

The processor device 601a has a data transmission path profile unit 502a, a data transmission path detection unit 502b and a filtering device 503. As described above with reference to FIG. 5, in this way the second and third threshold values 103b and 103c are used to produce a finger positioning signal 504 and to output it to a downstream processing device 308.

One advantage of the exemplary embodiment described with reference to FIG. 6 is that implementing the first stage, i.e. peak value detection device 501, in the matched hardware block 602a significantly reduces the volume of data which need to be transferred from the matched hardware block 602a to the processor device 601a via the processor bus.

FIG. 7 shows a further preferred exemplary embodiment of the present invention. A processor device 601b is connected to a matched hardware block 602b by means of processor bus 603. The matched hardware block 602b in the exemplary embodiment in FIG. 7 has, besides the power delay profile determination unit, a peak value sorting unit, with the received signal 301 respectively being supplied to the power delay profile determination unit 303 first of all.

The output signal from the power delay profile determination unit 303 is supplied to the peak value sorting unit 701, which provides sorting of the peak values 401a-401n in terms of a received signal power 107.

In the exemplary embodiment shown in FIG. 7, peak value detection is performed in a peak value detection device 501 provided in the processor device 601b. In the exemplary embodiment shown in FIG. 7, the first threshold value 103a now does not need to be provided in advance, in contrast to the exemplary embodiment shown in FIG. 6, but rather is set by a threshold value setting unit 702. A permanently set number of detected peak values which are sorted in terms of their magnitude by the peak value sorting unit 701 ensures that it is always the peak values 401a-401n with the highest received signal power 107 which are processed.

The first threshold value 103a, provided by the threshold value setting unit, is also supplied to the data transmission path detection unit 502b, in which the second threshold value 103b is set on the basis of the first threshold value 103a. The remaining blocks in the processor device 601b correspond, in terms of their manner of operation, to the blocks shown in FIG. 6 and are not described further at this point.

FIG. 8 shows a third preferred exemplary embodiment of the present invention. In FIG. 8, a matched hardware block 602c contains no function blocks other than the power delay profile determination unit 303. All other functions are performed in the processor device 601c in order to provide the correct finger positioning signal 504.

The exemplary embodiment shown in FIG. 8 opens up the highest level of flexibility for a threshold value calculation, but requires a relatively large output buffer store (not shown) for the matched hardware block 602c as a power delay profile determination unit 303.

Although the present invention has been described above with reference to preferred exemplary embodiments, it is not limited thereto but rather can be modified in diverse ways.

The invention is also not limited to said application options.

The invention claimed is:

1. A method for receiving a data stream transmitted via at least one data transmission path comprising the steps of:
receiving the data stream with a receiver;

determining a power delay profile for the received data stream, the power delay profile indicative of peak values of received power in a plurality of transmission path positions;

detecting at least one peak value in the power delay profile with a peak detector;

determining a data transmission path profile based upon the at least one peak detected, the data transmission path profile comprising at least one shadow transmission path, wherein the data transmission path profile is determined by counting the number of occurrences of detected peaks in the plurality of transmission path positions over a predetermined period, by comparing the number of occurrences counted to a predetermined threshold number of occurrences, by setting to zero each of the plurality of data transmission paths that do not exceed the predetermined threshold, and by determining the data transmission path profile based upon the plurality of data transmission paths that are not set to zero;

suppressing the at least one shadow transmission path in the data transmission path profile; and setting data transmission paths in the receiver based upon the suppressed data transmission path profile.

2. The method of claim 1, wherein the step of determining a data transmission path profile comprises the steps of:

storing the detected peaks from a predetermined number of power delay profiles;

summing the values of the stored detected peaks;

comparing the summed values to a predetermined threshold value; and determining a data transmission path profile based upon the summed values exceeding the predetermined threshold value.

3. The method of claim 1, wherein the step of detecting at least one peak value comprises the steps of:

selecting a first threshold;

comparing peak power in the plurality of transmission path positions to the first threshold; and detecting only peak power in each of the plurality of transmission path positions that is higher than the first threshold.

4. The method of claim 3, wherein the step of selecting the first threshold comprises the step of:

adaptively selecting the first threshold.

5. The method of claim 4, wherein the step of adaptively selecting the first threshold comprises the steps of:

determining the received signal strength of noise; and setting the threshold based upon the determined received signal strength of noise.

6. The method of claim 4, wherein the step of adaptively selecting the first threshold comprises the steps of:

sorting the peak values in the power delay profile by peak power; and setting the first threshold such that a predetermined number of peaks exceed the first threshold.

7. A receiver comprising:

a power delay profile determination unit operable to generate a power delay profile;

a peak value detection device, operably coupled to the power delay profile determination unit and operable to detect peaks above a first threshold in a generated power delay profile;

a data path determination unit operably coupled to the peak value detection unit and operable to generate a data transmission path profile as a function of peaks detected by the peak value detection device that are above a second threshold; and a shadow transmission path filter operably connected to the data path determination unit to filter shadow transmission paths from the data transmission path profile.

8. The receiver of claim 7 further comprising:

a peak value sorting unit operably connected to the power delay profile determination unit and operable to sort a generated power delay profile by peak power, and wherein the first threshold is selected such that a predetermined number of peaks in a generated power delay profile are detected by the peak value detection device.

9. A method of processing a received signal having power peaks including noise signal peaks and data signal peaks, in a device comprising a peak detector and a data path detector, the method comprising the steps of:

generating a delay power profile of the received signal in the form of peak values for a plurality of transmission path delays;

setting in the peak detector a first threshold at a first power level;

detecting with the peak detector delay power profile peaks above the first threshold; and determining a data transmission path profile representing at least one data transmission path based upon the peaks detected by the data path detector, wherein the data transmission path profile is determined by storing over a predetermined period of time detected peaks for a plurality of transmission path delays, by counting the number of stored detected peaks, by comparing the number of counted stored peaks to a predetermined threshold number, and by determining the data transmission path profile based upon the each of the plurality of transmission path delays that have a number of stored detected peaks that exceed the predetermined threshold number.

10. The method of claim 9, wherein the step of determining a data transmission path profile further comprises the steps of:

selecting a second threshold, the second threshold higher than the first threshold;

comparing the stored detected peaks for the plurality of transmission path delays that exceed the predetermined threshold number to the second threshold; and determining a data transmission path profile based upon each of the plurality of transmission path delays that have a number of stored detected peaks that exceed the predetermined threshold number and that have a peak value that exceeds the second threshold.

11. The method of claim 10, wherein the device further comprises a shadow transmission path filter, the method comprising the steps of:

determining the strongest at least one data transmission path;

determining a third threshold at a third power level based upon the strongest at least one data transmission path;

setting the third threshold in the shadow path filter; and filtering shadow path transmission signals in the data transmission path profile with the shadow path filter.

12. The method of claim 9, further comprising the step of:

adaptively selecting the power level of the first threshold.

13. The method of claim 12, wherein the step of adaptively selecting the power level of the first threshold comprises the steps of:

determining the received signal strength of a noise signal; and establishing the power level of the first threshold as a function of the noise signal received signal strength.

14. The method of claim 12, further comprising the steps of:

sorting the peaks in the power delay profile by power;

establishing a number of peaks to be detected by the peak detector;

comparing the sorted peaks with the established number of peaks to be detected; and selecting the power level of the first threshold based upon the comparison, such that the peak detector detects the established number of peaks.

* * * * *